United States Patent
Resch et al.

(10) Patent No.: US 8,621,580 B2
(45) Date of Patent: Dec. 31, 2013

(54) RETRIEVING ACCESS INFORMATION IN A DISPERSED STORAGE NETWORK

(75) Inventors: Jason K. Resch, Chicago, IL (US);
Gary W. Grube, Barrington Hills, IL (US); S. Christopher Gladwin, Chicago, IL (US); Thomas Franklin Shirley, Jr., Wauwatosa, WI (US); Timothy W. Markison, Mesa, AZ (US)

(73) Assignee: Cleversafe, Inc., Chicago, IL (US)

( * ) Notice: Subject to any disclaimer, the term of this patent is extended or adjusted under 35 U.S.C. 154(b) by 334 days.

(21) Appl. No.: 13/197,998

(22) Filed: Aug. 4, 2011

(65) Prior Publication Data

US 2011/0289565 A1      Nov. 24, 2011

Related U.S. Application Data

(63) Continuation-in-part of application No. 13/097,396, filed on Apr. 29, 2011.

(60) Provisional application No. 61/377,413, filed on Aug. 26, 2010, provisional application No. 61/346,173, filed on May 19, 2010.

(51) Int. Cl.
*G06F 7/04* (2006.01)
*G06F 17/30* (2006.01)
*G06F 15/177* (2006.01)

(52) U.S. Cl.
USPC ............................. 726/5; 707/999.1; 709/217

(58) Field of Classification Search
USPC ............. 726/5; 707/999.1; 709/217; 714/763
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Techane Gergiso
(74) *Attorney, Agent, or Firm* — Garlick & Markison; Timothy W. Markison

(57) ABSTRACT

A method begins by a processing module obtaining a set of recovered random numbers, decoding encrypted share slices to produce a set of encrypted shares, and obtaining a set of personalized authenticating values regarding user access to data. The method continues with the processing module generating a set of hidden passwords based on the set of personalized authenticating values, generating a set of blinded passwords based on the set of hidden passwords and a set of blinded random numbers, and generating a set of passkeys based on the set of blinded passwords and the set of recovered random numbers. The method continues with the processing module generating a set of decryption keys based on the set of blinded random numbers and the set of passkeys, decrypting the set of encrypted shares to produce a set of shares, and decoding the set of shares to reproduce the data.

22 Claims, 11 Drawing Sheets

(56) References Cited

U.S. PATENT DOCUMENTS

| | | |
|---|---|---|
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1* | 6/2005 | Redlich et al. ........ 709/228 |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

* cited by examiner

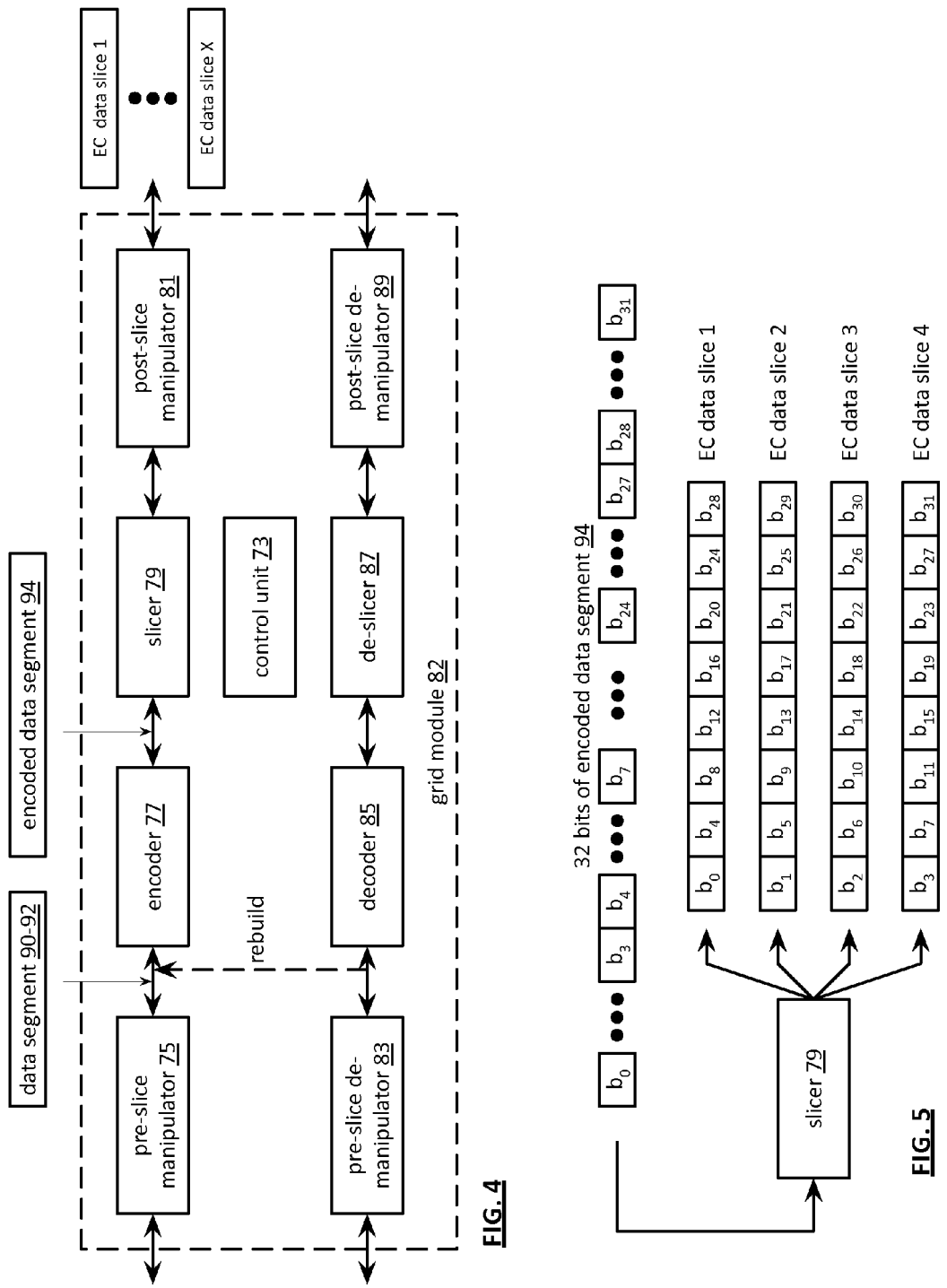

RETRIEVING ACCESS INFORMATION IN A DISPERSED STORAGE NETWORK

CROSS REFERENCE TO RELATED PATENTS

The present U.S. Utility Patent Application claims priority pursuant to:

(1) 35 USC §120 as a continuation-in-part patent application of co-pending patent application entitled STORAGE OF SENSITIVE DATA IN A DISPERSED STORAGE NETWORK, having a filing date of Apr. 29, 2011, and a Ser. No. of 13/097,396, which claims priority under 35 USC §119 to a provisionally filed patent application entitled DISPERSED STORAGE NETWORK MEMORY DEVICE UTILIZATION having a provisional filing date of May 19, 2010, and a provisional Ser. No. 61/346,173 all of which are incorporated herein by reference in their entirety and made part of the present U.S. Utility Patent Application for all purposes; and (2) 35 U.S.C. §119(e) to U.S. Provisional Application Ser. No. 61/377,413, entitled "ACCESS INFORMATION DISTRIBUTION UTILIZING DISTRIBUTED AUTHENTICATION," filed Aug. 26, 2010, pending, which is hereby incorporated herein by reference in its entirety and made part of the present U.S. Utility Patent Application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the invention;

FIG. 5 is a diagram of an example embodiment of error coded data slice creation in accordance with the invention;

DETAILED DESCRIPTION OF THE INVENTION

Figure 1:
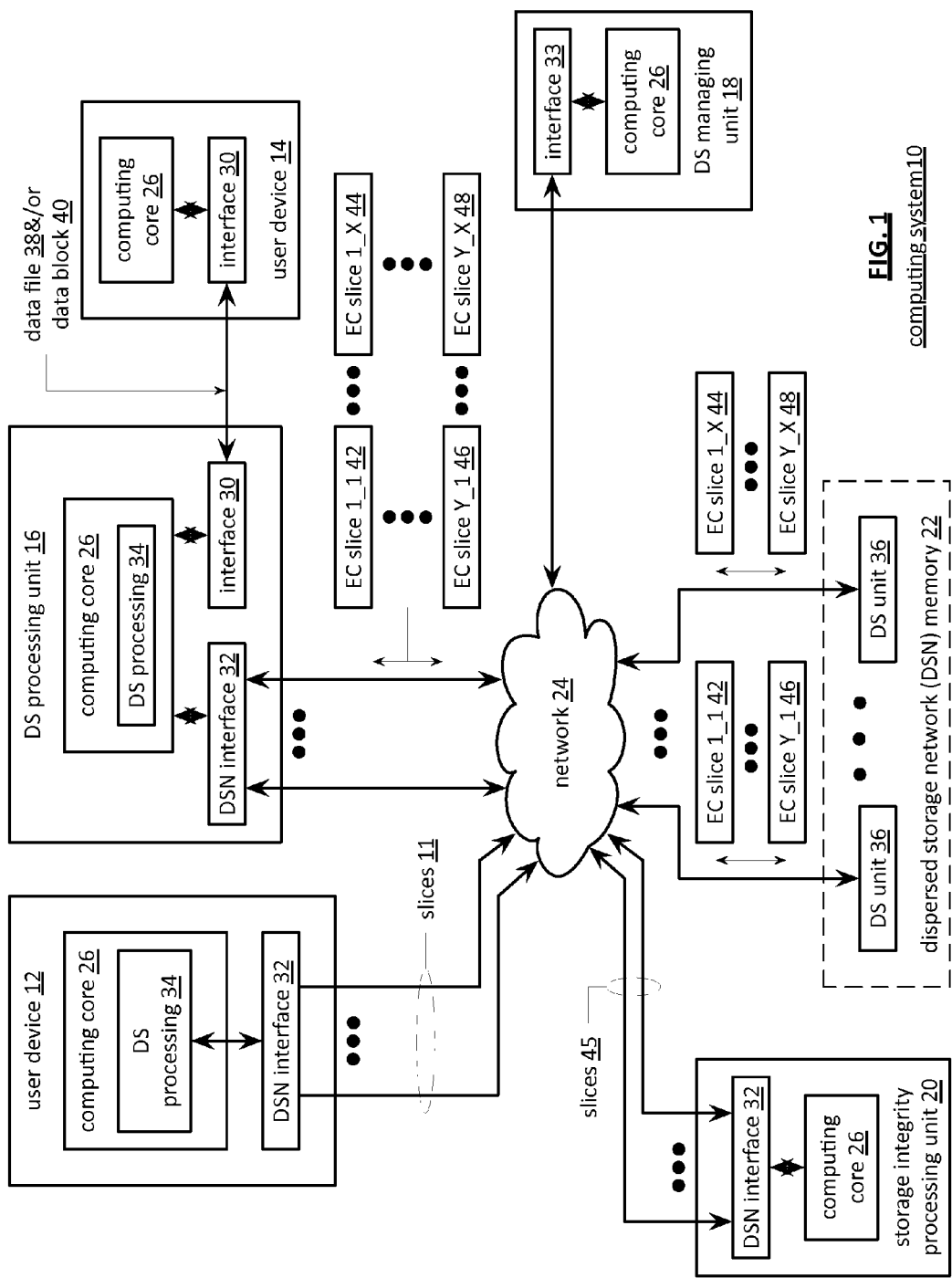
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-12.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security. Further examples of encoding the data segments will be provided with reference to one or more of FIGS. 2-12.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
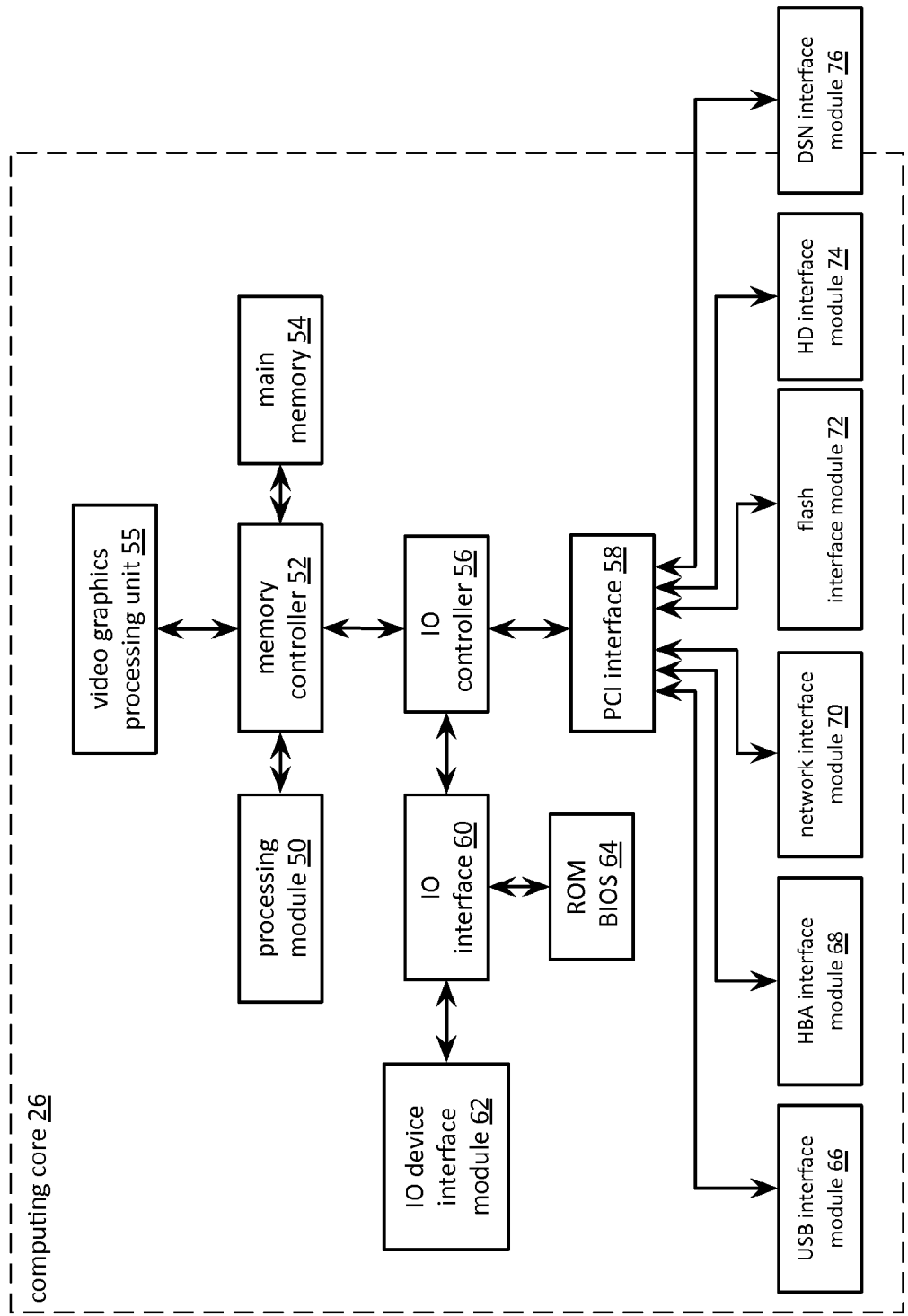
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output I/O controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-12.

Figure 3:
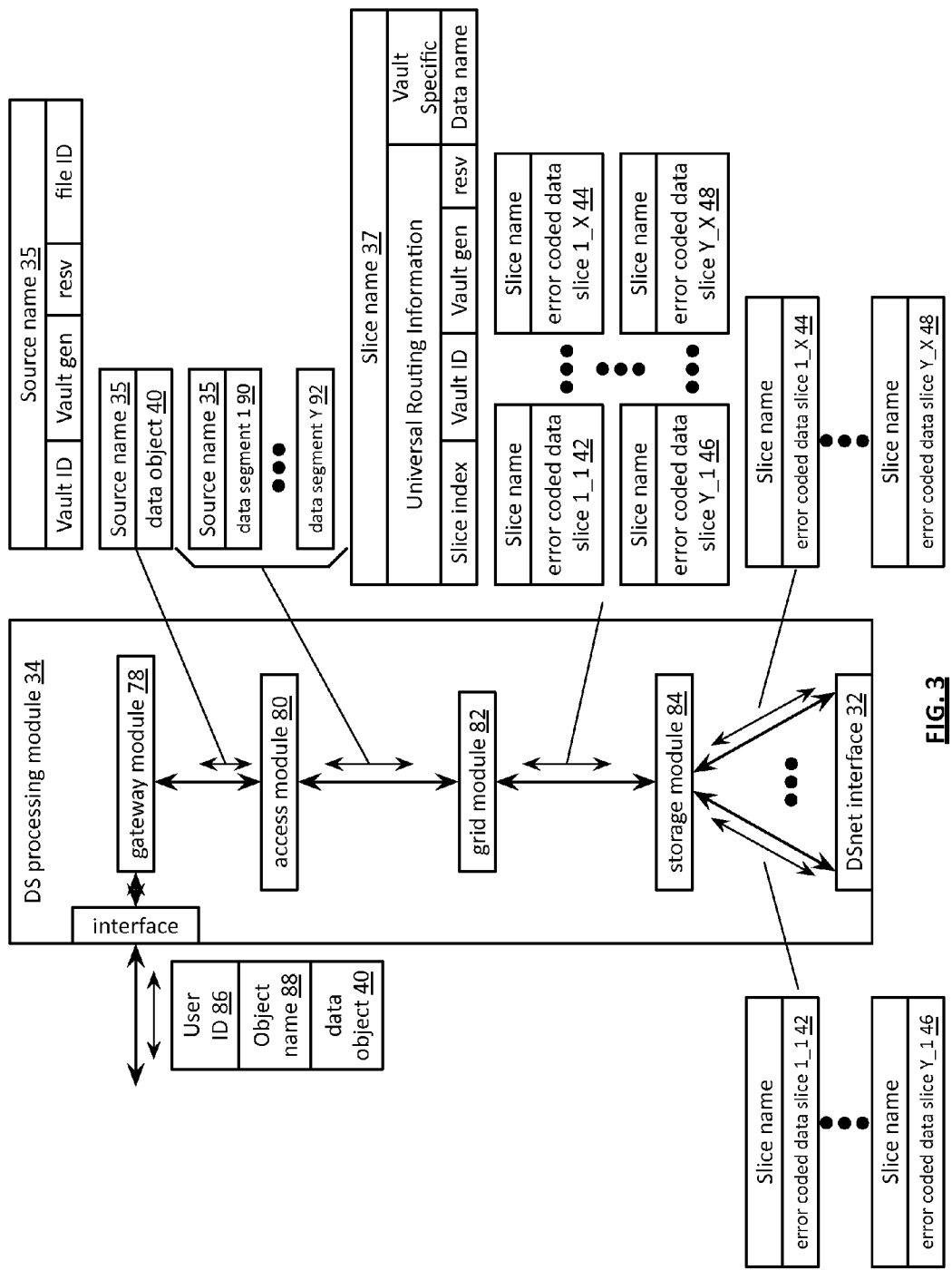
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 60 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
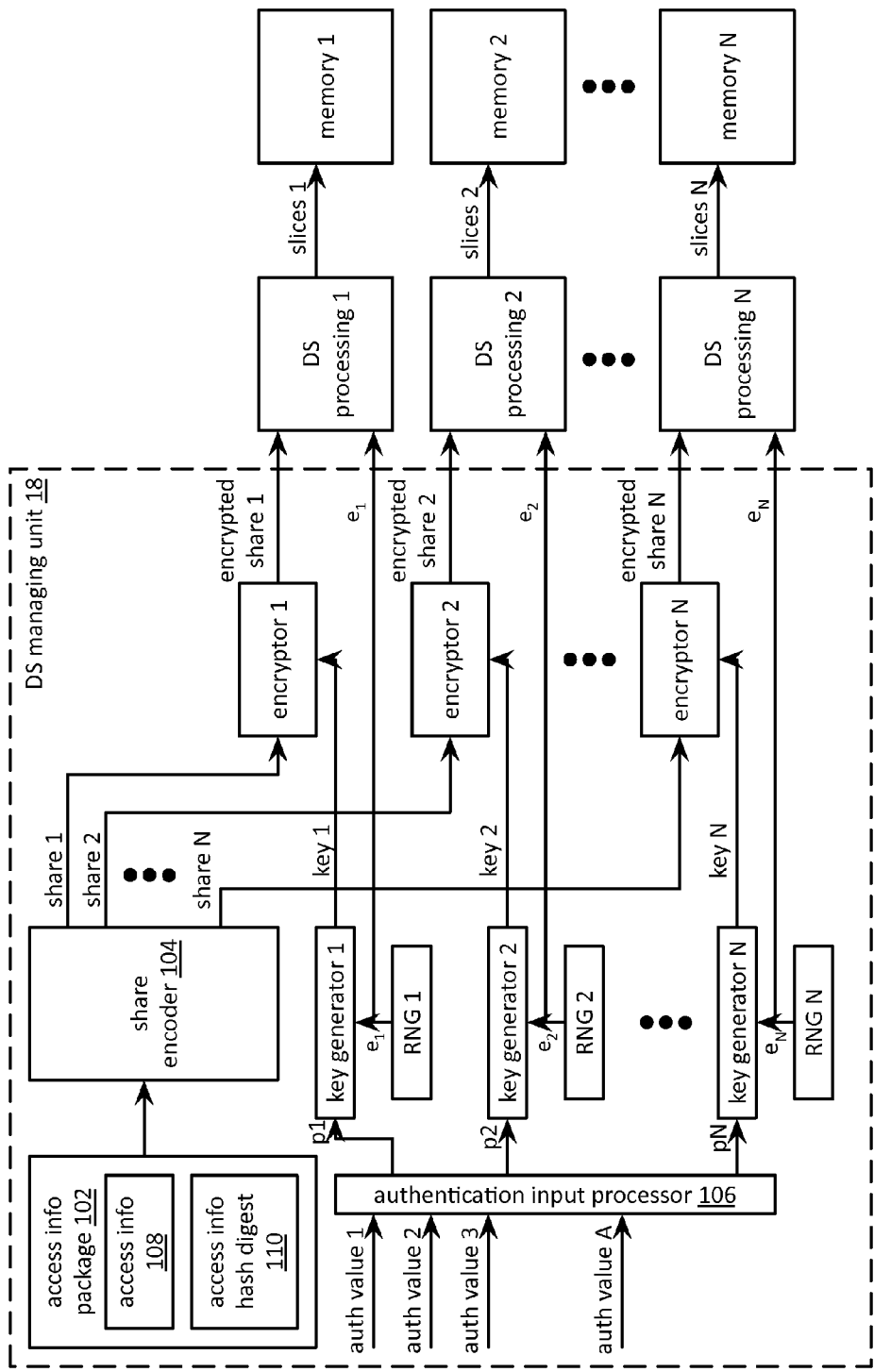
FIG. 6 is a schematic block diagram of an embodiment of an access information storage system in accordance with the invention.

FIG. 6 is a schematic block diagram of an embodiment of an access information storage system that includes a user dispersed storage (DS) managing unit 18, at least one dispersed storage (DS) processing unit 16 of a plurality of DS processing units 1-N, and at least one dispersed storage network (DSN) memory 22 of a plurality of DSN memories 1-N. For example, the system may include N DS processing units 1-N and N DSN memories 1-N. As another example, the system may include one DS processing unit and N DSN memories. As yet another example, the system may include N DS processing units 1-N and one DSN memory. Each DS processing unit 1-N may be implemented utilizing an authentication server.

The DS managing unit 18 includes an access information package 102, a share encoder 104, a plurality of random number generators (RNG) 1-N, a plurality of key generators 1-N, an authentication input processor 106, and a plurality of encryptors 1-N. The access information package 102 includes access information 108 and an access information hash digest 110. The access information hash digest 110 may be generated by utilizing a hashing function on the access information 108 and may be utilized in a subsequent integrity verification step to verify that the access information 108 has not been tampered with.

The access information 108 may include one or more of a user device identifier (ID), a communications path identifier, a wireless channel identifier, a communications system talkgroup identifier, an encryption key, a credential, access permissions, authentication information, and access privileges. The access information 108 may be subsequently utilized by a user device to gain access to a system (e.g., an information system, a data storage system, a communication system, a control system, etc.). Gaining access may include one or more of establishing a connection, receiving content from the system, sending content to the system, deleting content from the system, receiving a communication, and sending a communication. For example, a first wireless user device utilizes the access information 108 to gain access to a plurality of other wireless devices. For instance, the first wireless user device utilizes access information 108 that includes a wireless channel identifier and a broadcast communication encryption key associated with the plurality of other wireless devices.

The share encoder 104 encodes the access information package 102 in accordance with a share encoding function to produce a plurality of encoded shares 1-N. The share encoding function includes at least one of a dispersed storage error encoding function and a secret sharing function (e.g., a Shamir secret sharing algorithm). The encryptors 1-N encrypt the encoded shares 1-N in accordance with an encryption algorithm utilizing keys 1-N to produce encrypted shares 1-N. Generation of the keys 1-N is discussed in greater detail below. The encryption algorithm may be in accordance with dispersed storage error coding parameters. For example, each of the encryptors 1-N utilize a common encryption algorithm in accordance with the dispersed storage error coding parameters. As another example, at least two encryptors of the encryptors 1-N utilize different encryption algorithms in accordance with the dispersed storage error coding parameters.

The encryptors 1-N output the encrypted shares 1-N to the DS processing units 1-N. The DS processing units 1-N dispersed storage error encodes each encrypted share of the encrypted shares 1-N to produce N groups of encoded share slices in accordance with the error coding dispersal storage function parameters, wherein each group of encoded share slices includes one or more sets of encoded data slices. The DS processing units 1-N send the N groups of encoded share slices to the DSN memories 1-N for storage therein. Alternatively, the functionality of the DS processing unit (e.g., DS processing 34) may be included in the DS managing unit 18 such that the DS managing unit 18 dispersed storage error encodes the encrypted shares 1-N to produce the N groups of encoded share slices. The DS managing unit 18 sends the N groups of encoded share slices to the DSN memories 1-N for storage therein. Alternatively, the encryptors 1-N output the encrypted shares 1-N to one or more of the DSN memories 1-N for storage therein (e.g., without producing N groups of encoded share slices). Alternatively, the DS processing units 1-N send the encrypted shares 1-N to the one or more of the DSN memories 1-N for storage therein.

The authentication input processor 106 generates a plurality of hidden passwords p1-pN based on a set of personalized authenticating values 1-A. The personalized authenticating values 1-A includes one or more of at least one of a user device identifier (ID), a user ID, a personal information number (PIN), a badge ID, a district ID, a work-shift ID, an assignment ID, a mission ID, a passcode, a password, a picture file, a video file, an audio file, a retinal scan, a facial scan, a fingerprint scan, a personal secret, a password index number, and any other values that can be subsequently provided by a user of a user device. The generating of the plurality of hidden passwords p1-pN includes transforming the set of personalized authenticating values 1-A in accordance with a set of transformation functions to produce a set of transformed personalized authenticating values and for each password of the corresponding plurality of hidden passwords, combining, in accordance with a combining function, one of the set of transformed personalized authenticating values with at least one of a constant and another one of the set of transformed personalized authenticating values to produce the password. In an instance, each hidden password is unique from all the other hidden passwords. In another instance, each hidden password is substantially the same as all the other hidden passwords.

For example, the authentication input processor 106 obtains a personalized authenticating value 1 from a fingerprint reader output and calculates a hash to produce a first intermediate result. Next, the authentication input processor 106 obtains a personalized authenticating value 2 as a PIN and adds the PIN to the first intermediate result to produce a hidden password core. The authentication input processor 106 partitions the hidden password core to produce the hidden passwords p1-pN. Alternatively, the authentication input processor 106 replicates the hidden password core to produce the hidden passwords p1-pN.

The random number generators 1-N generate a plurality of random numbers $e_1$-$e_N$. For example, random numbers $e_1$-$e_N$ are each a same number of bits as a number of bits of p, where p is determined by security parameters (e.g., of the dispersed storage error coding parameters). The random number generators 1-N output the plurality of random numbers $e_1$-$e_N$ to the DS processing units 1-N. The DS processing units 1-N dispersed storage error encodes each random number of the plurality of random numbers in accordance with the dispersed storage error coding parameters to produce N groups of encoded random number slices, wherein each group of encoded random number slices includes at least one set of random number slices. Next, the DS processing units 1 send the groups of encoded random number slices to the DSN memories 1-N for storage therein. Alternatively, the DS managing unit 18 dispersed storage error encodes the plurality of random numbers to produce the N groups of encoded random number slices. Next, the DS managing unit 18 sends the N groups of encoded random number slices to the DSN memories 1-N for storage therein. Alternatively, the DS managing 18 sends the plurality of random numbers $e_1$-$e_N$ to the one or more of the DSN memories 1-N for storage therein.

The key generators 1-N generate the keys 1-N based on one or more of the plurality of random numbers $e_1$-$e_N$, the security parameters, and the hidden passwords p1-pN. Each key of the keys 1-N includes a same number of bits as a number of bits of p. For example, the key generators 1-N generate the keys 1-N by transforming an expansion of the hidden password p1-pN utilizing a mask generating function (MGF) and the random number $e_1$-$e_N$ in accordance with the expression: key $x=((MGF(px))^2)^{e_x}$ modulo p. For example, key $1=4MGF(p1))^2)^{e_1}$ modulo p. In an instance, the generator 1 calculates key 1=13 when MGF(p1)=4, $e_1$=10, and p=23, since $(4^2)^{10}$ mod 23=13. Alternatively, or in addition to, the key may be further processed to provide a key of a desired length in relation to an encryption algorithm. For example, the key output of the algorithm is hashed to produce a hashed key and a desired number of bits (e.g., 256, 192, 128 bits) of the hashed key are utilized as a key for the encryption algorithm. The method of operation of the DS managing unit 18 to store the access information package 102 is discussed in greater detail with reference to FIGS. 7-8.

Note that the one or more hidden passwords p1-pN and a decode threshold number of pairs of random numbers $e_x$ and encrypted shares x are required to reverse the process to decode a threshold number of shares to reproduce the access information package 102. The method to reproduce the access information package 102 is discussed in greater detail with reference to FIGS. 9-12. Note that a security improvement is provided by the system when the pairs of random numbers $e_x$ and encrypted shares x are stored on substantially different authentication servers and/or via two or more DS processing units and two or more DSN memories by reducing the likelihood of a successful attack to gain access to the pairs of random numbers $e_x$ and encrypted shares x.

Figure 7:
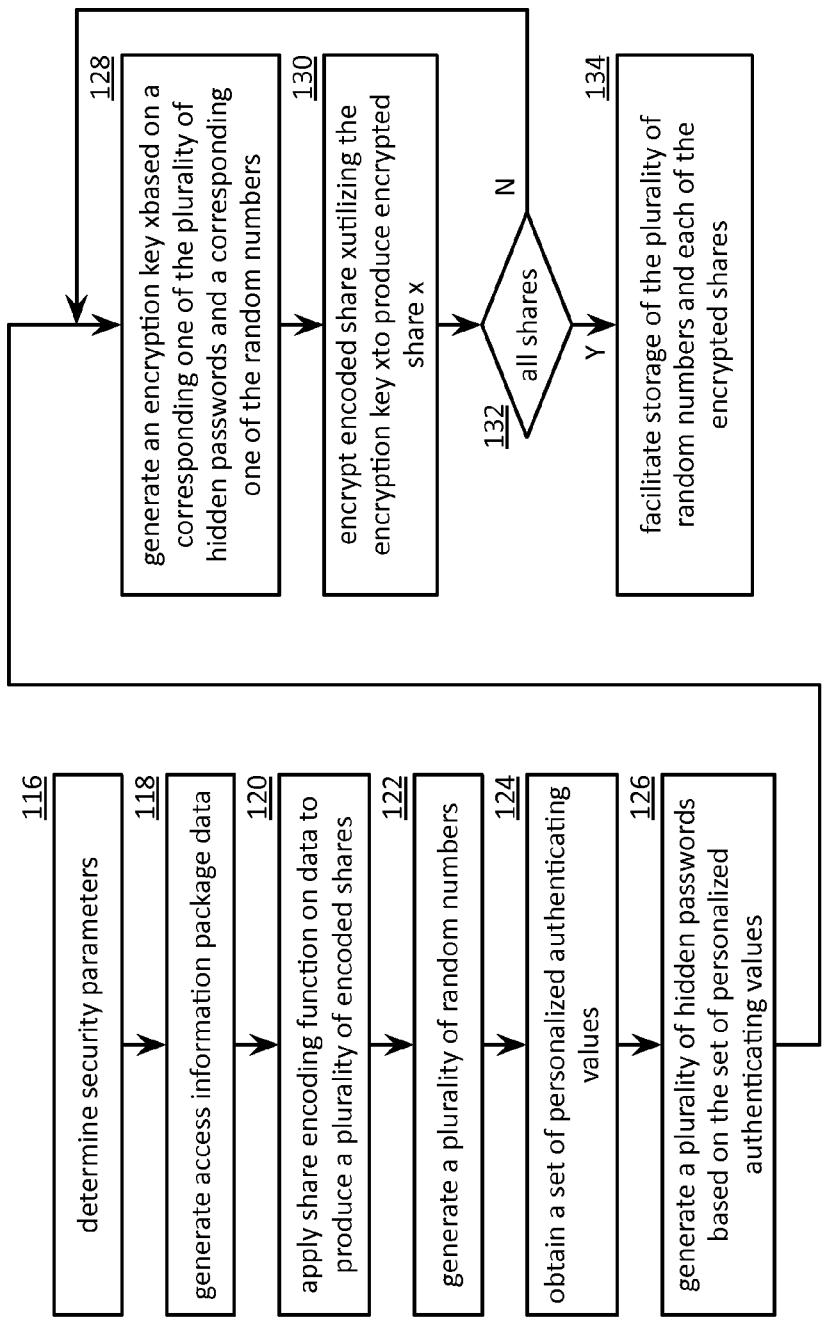
FIG. 7 is a flowchart illustrating an example of storing access information in accordance with the invention.

FIG. 7 is a flowchart illustrating an example of storing access information. The method begins with step 116 where a processing module (e.g., of a dispersed storage (DS) managing unit) determines security parameters to be utilized in storing an access information package of data. The security parameters may include one or more of a share number N, a value of security algorithm constant p (a prime number), a value of security algorithm constant q (a prime number), one or more shared secret algorithm parameters, an encryption algorithm indicator, a key generator function indicator, a key size, a random number generator function, a random number size, a hash function type indicator, a security package structure indicator, and any other parameter to specify the operation of the storing of the access information package data. The determination may be based on one or more of security requirements, a security status indicator, a user identifier (ID), a vault ID, a list, a table lookup, a predetermination, a message, and a command. For example, the processing module determines the security parameters based on a table lookup corresponding to a user ID affiliated with a user device associated with the access information package data.

The method continues at step 118 where the processing module generates the access information package data. For example, the processing module calculates a hash digest of a group broadcast encryption key and bundles the hash digest with the key to create the access information package data. The method continues at step 120 where the processing module applies a share encoding function on the data to produce a plurality of encoded shares 1-N. The share encoding function includes at least one of a dispersed storage error encoding function and a secret sharing function (e.g., Shamir's secret sharing scheme, Blakley's scheme, Chinese Remainder Theorem scheme). For example, the processing module creates shares 1-16 in accordance with shared secret algorithm parameters when the share encoding function is the secret sharing function and N=16. As another example, the processing module dispersed storage error encodes the access information package data in accordance with an error coding dispersal storage function to produce shares 1-16 as encoded data slices when the share encoding function is the dispersed storage error encoding function and a pillar width is 16.

The method continues at step 122 where the processing module generates a plurality of random numbers. The generating includes obtaining a plurality of base random numbers and expanding each base random number of the plurality of base random numbers based on the security parameters to produce the plurality of random numbers. For example, the processing module produces a random number $e_x$ utilizing a random number generator function such that the bit length of the random number $e_x$ is substantially the same as a bit length of a value of security algorithm constant p and/or a bit length of a value of security algorithm constant q. For instance, the processing module produces a random number $e_3$ that is 1,024 bits in length when the security algorithm constant p is 1,024 bits in length.

The method continues at step 124 where the processing module obtains a set of personalized authenticating values regarding user access to the data. The set of personalized authenticating values includes at least one of a user device identifier (ID), a user ID, a personal information number (PIN), a badge ID, a district ID, a work-shift ID, an assignment ID, a mission ID, a passcode, a password, a picture file, a video file, an audio file, a retinal scan, a facial scan, a fingerprint scan, a personal secret, and a password index number. The obtaining may be based on one or more of a user device query, registration information, a lookup, a user device input, a DS managing unit input, a DS managing unit lookup, a message, and a command. For example, the processing module obtains a PIN personalized authenticating value via a query to an associated user device. As another example, the processing module performs a badge ID table lookup to obtain a badge ID personalized authenticating value.

The method continues at step 126 where the processing module generates a plurality of hidden passwords based on the set of personalized authenticating values. The generating includes transforming the set of personalized authenticating values in accordance with a set of transformation functions to produce a set of transformed personalized authenticating values and for each hidden password of the corresponding plurality of hidden passwords, combining, in accordance with a combining function, one of the set of transformed personalized authenticating values with at least one of a constant and another one of the set of transformed personalized authenticating values to produce an intermediate password. The intermediate password may be transformed utilizing a transformation function to produce the hidden password. The transformation function includes at least one of a null function, a concatenation function, an inverting function, a hashing function, an encryption function, a compressing function, and a mask generating function. The combining function includes at least one of an addition function, a subtraction function, a multiplication function, a division function, a logical exclusive OR function, a logical OR function, and a logical AND function.

For example, the processing module performs a hashing function on a PIN personalized authenticating value to produce a first transformed personalized authenticating value and performs an inverting function on a badge ID to produce a second transformed personalized authenticating value. Next the processing module performs a logical exclusive OR as the combining function on the first and second transformed personalized authenticating values to produce a first hidden password of the plurality of hidden passwords.

The method continues at step 128 where the processing module generates an encryption key based on a corresponding one of the plurality of hidden passwords and a corresponding one of the plurality of random numbers. The generating includes transforming the corresponding one of the plurality of hidden passwords utilizing a mask generating function (MGF), security parameters, and the corresponding one of the plurality of random numbers. For example, the processing module generates a key x based on hidden password px and corresponding random number $e_x$ in accordance with the expression key $x=((MGF(px))^2)^{e_x}$ modulo p as previously discussed with reference to FIG. 6.

The method continues at step 130 where the processing module encrypts a encoded share x utilizing an encryption key x in accordance with an encryption algorithm to produce an encrypted share x. The encryption under the may be based on one or more of the security parameters, the dispersed storage error coding parameters, a user identifier (ID), a vault ID, a vault lookup, security requirements, a security status indicator, a message, and a command.

The method continues at step 132 where the processing module determines whether all N encoded shares have been encrypted. The determination may be based on comparing a number of encrypted shares produced so far to a value of N. The method repeats back to step 128 when the processing module determines that all N encrypted shares have not been produced. The method continues to step 134 when the processing module determines that all N encrypted shares have been produced.

The method continues at step 134 where the processing module facilitating storage of the plurality of random numbers and each of the encrypted shares. The facilitating includes at least one of sending the encrypted share and the corresponding one of the corresponding plurality of random numbers to a dispersed storage (DS) processing unit, dispersed storage error encoding the encrypted share to produce a plurality of encoded share slices and outputting the plurality of encoded share slices for storage, and dispersed storage error encoding the corresponding one of the corresponding plurality of random numbers to produce a plurality of encoded random number slices and outputting the plurality of encoded random number slices for storage. For example, the DS processing module encodes the encrypted share x and the random number $e_x$ in accordance with an error coding dispersal storage function to produce encoded data slices for storage in memories. The processing module may facilitate the storage of each pair of encrypted share x and random number $e_x$ such that at least two or more of the pairs are stored in different memories (e.g., different DS units, different DSN memories, different authentication servers, at different geographic locations, etc.) to provide a system security improvement.

Figure 8:
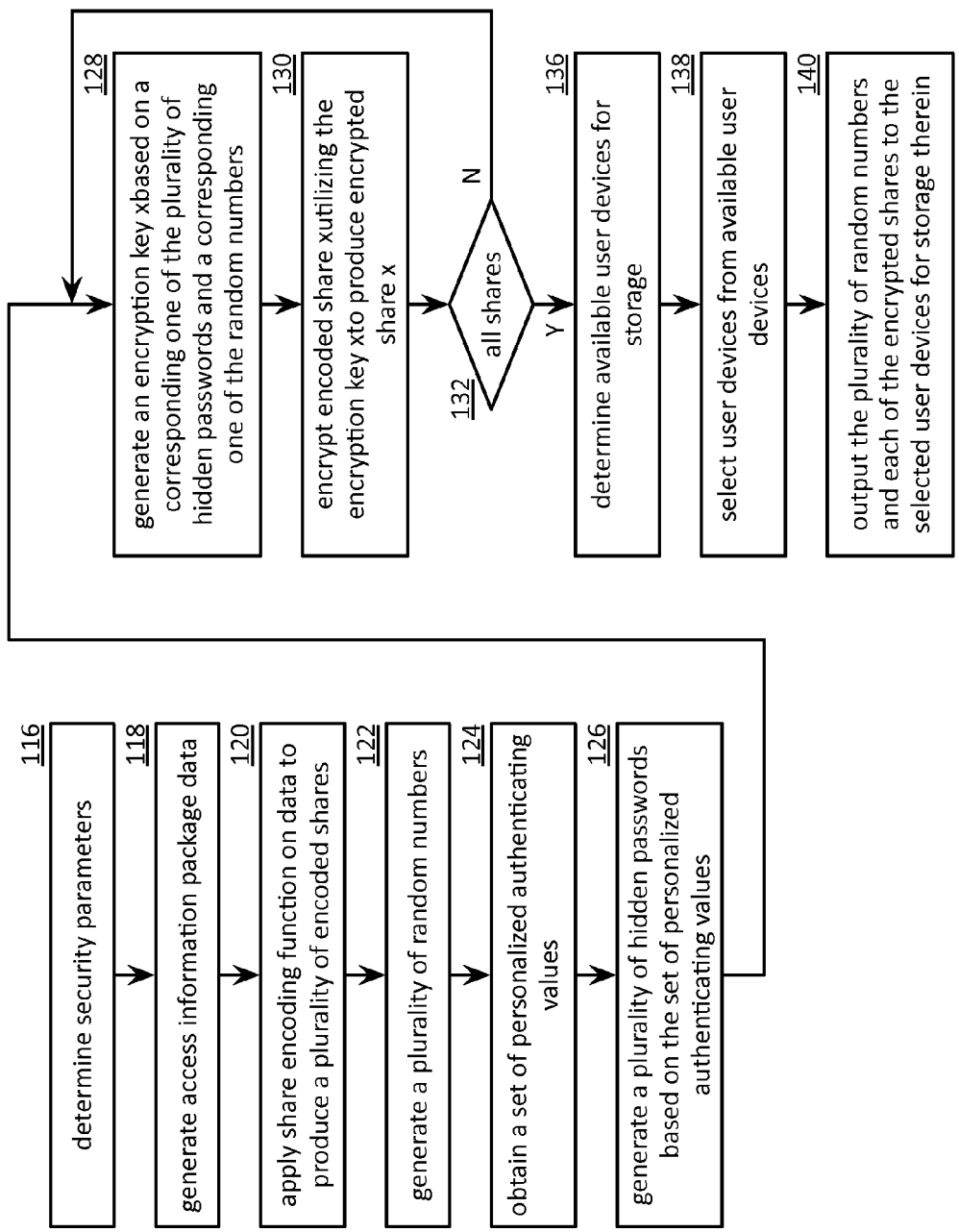
FIG. 8 is a flowchart illustrating another example of storing access information in accordance with the invention.

FIG. 8 is another flowchart illustrating another example of storing access information, which includes similar steps to FIG. 7. The method begins with steps 116-132 of FIG. 7 where a processing module (e.g., of a dispersed storage (DS) managing unit) determines security parameters, generates an access information package (e.g., data), applies a share encoding function on the data to produce a plurality of encoded shares, generates a plurality of random numbers, obtains a set of personalized authenticating values, generates a plurality of hidden passwords based on the set of personalized authenticating values, generates an encryption key based on a corresponding one of the plurality of hidden passwords and a corresponding one of the random numbers, encrypts an encoded share utilizing the encryption key to produce an encrypted share, and determines whether all encoded shares have been encrypted. The method repeats back to step 128 of FIG. 7 when the processing module determines that all encrypted shares have not been produced. The method continues to step 136 when the processing module determines that all encrypted shares have been produced.

The method continues at step 136 where the processing module determines available user devices for storage of the encrypted shares and the plurality of random numbers. The determination may be based on one or more of detecting wireless user devices within range of a target user device, a user device query, a user device response, a list of affiliated user devices, and a command. For example, the processing module determines available user devices by sending a plurality of availability requests to a plurality of wireless devices that are affiliated (e.g., part of the same group) with the target user device. Next, the processing module receives a plurality of availability responses from the plurality of wireless devices.

The method continues at step 138 where the processing module selects user devices from the available user devices. The selection may be based on one or more of a number of encrypted shares to be stored (e.g., a value of N), the available user devices, a proximity indicator for each user device, selecting user devices that are the closest to the target user device (e.g., based on a response to a query), user devices that have a favorable performance history, user devices that have a favorable availability history, a user device query, a user device response, the list of affiliated user devices, and a command. For example, the processing module selects user devices 5, 11, 40, 2, 44, and 20 when N=6 and each of the selected user devices has favorable availability and performance histories.

The method continues at step 140 where the processing module outputs the plurality of random numbers and each of the encrypted shares to the selected user devices for storage therein. For example, the processing module encodes encrypted share 2 and the random number $e_2$ in accordance with an error coding dispersal storage function to produce encoded data slices for storage in user device 2. Note that the processing module may facilitate storage of each pair of encrypted share x and random number $e_x$ such that at least two or more of the pairs are stored in different user devices to provide a system security improvement.

Figure 9:
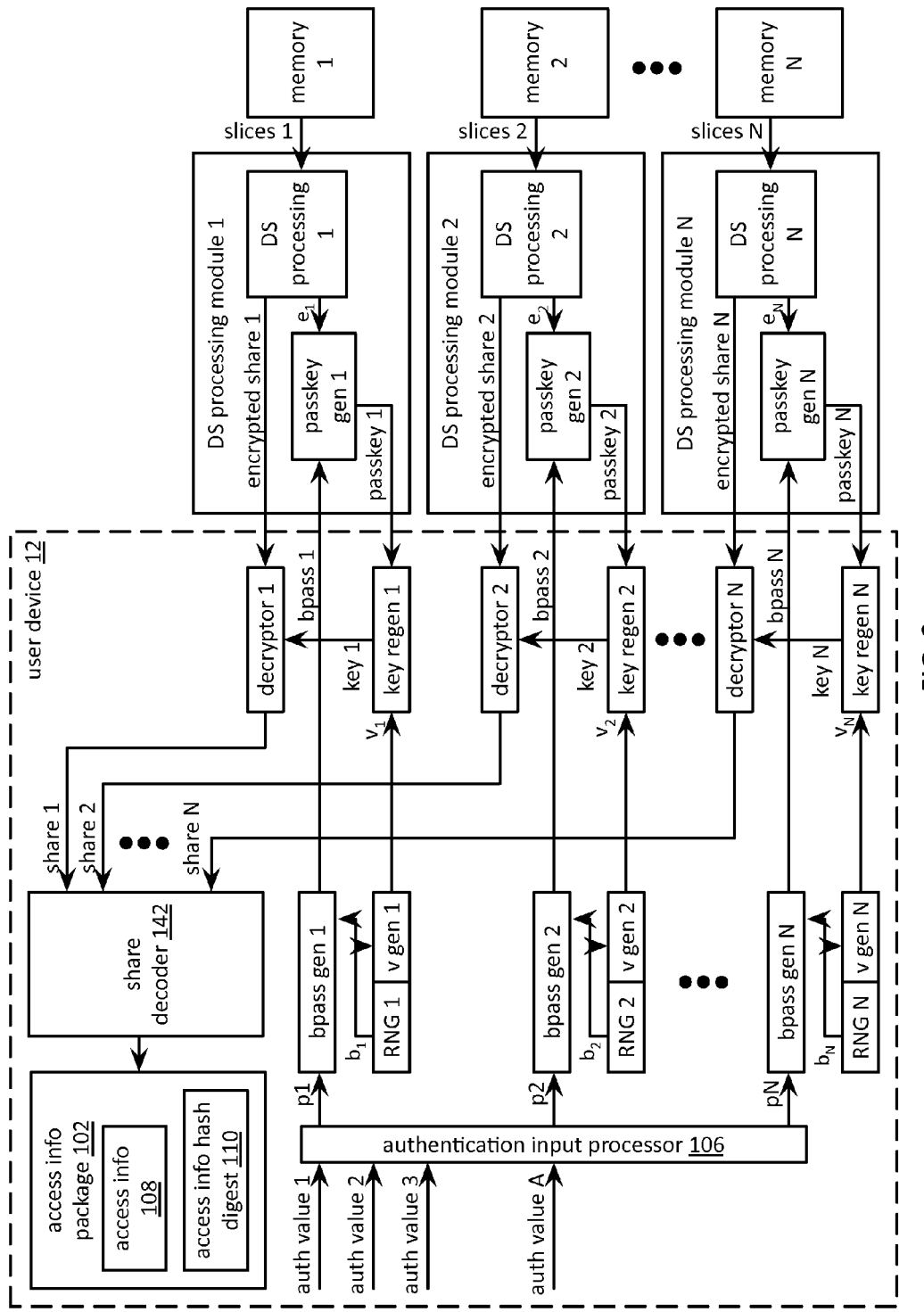
FIG. 9 is a schematic block diagram of an embodiment of an access information retrieval system in accordance with the invention.

FIG. 9 is a schematic block diagram of an embodiment of an access information retrieval system that includes a user device 12, a plurality of dispersed storage (DS) processing modules 1-N, and a plurality of memories 1-N. Each DS processing module 1-N may be implemented utilizing one or more of a DS processing unit 16 of FIG. 1, a web server, a DS unit, and an authentication server. The plurality of memories 1-N may be implemented utilizing at least one of one or more memory devices, one or more DS units, and one or more dispersed storage network (DSN) memories. For example, memory 1 is implemented as a first DS unit and memory 2 is implemented as a second DS unit. As another example, memory 1 is implemented as a first plurality of DS units and memory 2 is implemented as a second plurality of DS units, wherein the first and second plurality of DS units may or may not be the same DS units. As yet another example, DS processing module 1 and memory 1 are implemented as a first DS unit and DS processing module 2 and memory 2 are implemented as a second DS unit. Alternatively, the system may be implemented utilizing one DS processing module and N memories 1-N. As another alternative, the system may be implemented utilizing N DS processing modules and N dispersed storage network (DSN) memories. As yet another alternative an authentication server may substitute for each DS processing module 1-N and memory 1-N.

The DS processing modules 1-N includes DS processing 1-N and passkey generators 1-N. Alternatively, the user device 12 includes functionality of the DS processing units 1-N. The user device includes an access information package 102, a share decoder 142, an authentication input processor 106, a plurality of random number generators (RNG) 1-N, a plurality of blinded password generators 1-N (e.g., b-pass gen 1-N), a plurality of value generators (e.g., v gen 1-N), a plurality of key regenerators (e.g., key regen 1-N), and a plurality of decryptors 1-N. The access information package 102 includes access information 108 and an access information digest 110.

The authentication input processor 106 generates a plurality of hidden passwords p1-pN based on a set of personalized authenticating values 1-A. For example, the authentication input processor 106 obtains a badge identifier (ID) as a personalized authenticating value 1 based on a user input and calculates a hash of the value to produce a first intermediate result. Next, the authentication input processor 106 obtains a talk-group ID as a personalized authenticating value 2 and adds the second value to the first intermediate result to produce a hidden password core. The authentication input processor 106 partitions the hidden password core to produce the hidden passwords p1-pN. Alternatively, the authentication input processor 106 replicates the hidden password core to produce the hidden passwords p1-pN.

The random number generators 1-N generate blinded random numbers $b_1$-$b_N$. For example, each random number generator of the random number generators 1-N generates a blinded random number of the blinded random numbers $b_1$-$b_N$ such that each blinded random number includes a same number of bits as a number of bits of p, wherein p is extracted from dispersed storage error coding parameters and/or security parameters. The random number generators 1-N send the blinded random numbers $b_1$-$b_N$ to the blinded password generators 1-N and to the value generators 1-N.

The blinded password generators 1-N generate blinded passwords (bpass) 1-N based on security parameters, the blinded random numbers $b_1$-$b_N$, and the hidden passwords p1-pN. The blinded passwords 1-N are generated such that each blinded random number includes a same number of bits as a number of bits of security perimeter p. For example, the blinded password generators 1-N generate the bpass 1-N values by transforming an expansion of the hidden password p1-pN into the same number of bits as the security parameter constant p utilizing a mask generating function (MGF) and one of the blinded random numbers $b_1$-$b_N$ in accordance with the expression bpass x=$((MGF(px))^2)^b_x$ modulo p. For example, bpass 1=$((MGF(p1))^2)^{b_1}$ modulo p. In an instance, the blinded password generator 1 calculates bpass 1=18 when MGF(p1)=4, $b_1$=7, and p=23, since $(4^2)^7$ mod 23=18. The blinded password generators 1-N send the bpass 1-N values to the passkey generators 1-N to retrieve passkeys 1-N as described below.

The value generators 1-N generate values $v_1$-$v_N$ based on the blinded random numbers $b_1$-$b_N$ and the value of a security parameters constant q in accordance with an expression b*v modulo q=1. The value of q is based on a value of p in accordance with the expression q=(p-1)/2. For example, q=11 when p=23. For instance, value generator 1 generates a value v1=8 when $b_1$=7 and q=11 since 7*8=56 and 56 modulo 11=1. The value generators 1-N send the values $v_1$ through $v_N$ to the key regenerators 1-N.

The passkey generators 1-N retrieve previously stored random number values $e_1$ through $e_N$ from DS processing 1-N to produce recovered random numbers $e_1$ through $e_N$ in response to receiving a retrieve access information package request from the user device 12. Alternatively, the user device 12 directly retrieves stored random number values $e_1$ through $e_N$. For example, DS processing 1-N retrieves the least a decode threshold number of stored random number slices of slices 1-N to produce a set of recovered random numbers. The passkey generators 1-N generate passkey 1-N based on recovered random numbers $e_1$ through $e_N$ and the values of bpass 1-N received from the blinded password generators 1-N in accordance with the expression passkey x=(bpass x)$^e_x$ modulo p. For example, passkey generator 1 generates a passkey 1=9 when bpass 1=18, $e_1$=10, and p=23 since $(18)^{10}$ modulo 23=9.

The key regenerators 1-N receive the passkey 1-N values from the passkey generators 1-N and regenerates keys 1-N based on the passkeys 1-N and the values $v_1$ through $v_N$ in accordance with an expression key x=(passkey x)$^V_x$ modulo p. For example, key regenerator 1 regenerates key 1 such that key 1=13 when passkey 1=9, v1=8, and p=23 since $(9)^8$ modulo 23=13. The key regenerators 1-N send keys 1-N to the decryptors 1-N.

The DS processing 1-N retrieve, de-slice, and decodes at least a decode threshold number of encrypted share slices of slices 1-N utilizing an error coding dispersal storage function to produce a set of encrypted shares 1-N from one or more of the memories 1-N in response to an access information package retrieval request received from the user device 12. The decryptors 1-N receive the set of encrypted shares 1-N from the DS processing 1-N. The decryptors 1-N decrypt the encrypted shares 1-N utilizing keys 1-N in accordance with a decryption algorithm to produce shares 1-N. Alternatively, the decryptors 1-N decrypt the encrypted shares 1-N to produce encoded data slices as the shares 1-N. The decryption algorithm may be in accordance with operational parameters and/or the security parameters of the user device 12. For example, each of the decryptors 1-N utilizes substantially the same decryption algorithm in accordance with the operational parameters and/or security parameters. Alternatively, at least two of the decryptors 1-N utilize a different decryption algorithm in accordance with the operational parameters and/or the security parameters. The decryptors 1-N send the shares 1-N to the share decoder 142.

The share decoder 142 decodes at least a decode threshold number of shares 1-N to reproduce the access information package 102 (e.g., data). The decoding may include at least one of dispersed storage error decoding the shares 1-N to reproduce the data and decoding the shares 1-N utilizing a secret sharing function to reproduce the data. For example, the share decoder 142 decodes the set of shares utilizing a Shamir secret sharing algorithm. As another example, the share decoder 142 decodes at least the decode threshold number of shares 1-N (e.g., encoded data slices) in accordance with an error coding dispersal storage function to produce the access information package 102. The method to retrieve securely stored access information package 102 is discussed in greater detail with reference to FIGS. 10-12.

Figure 10:
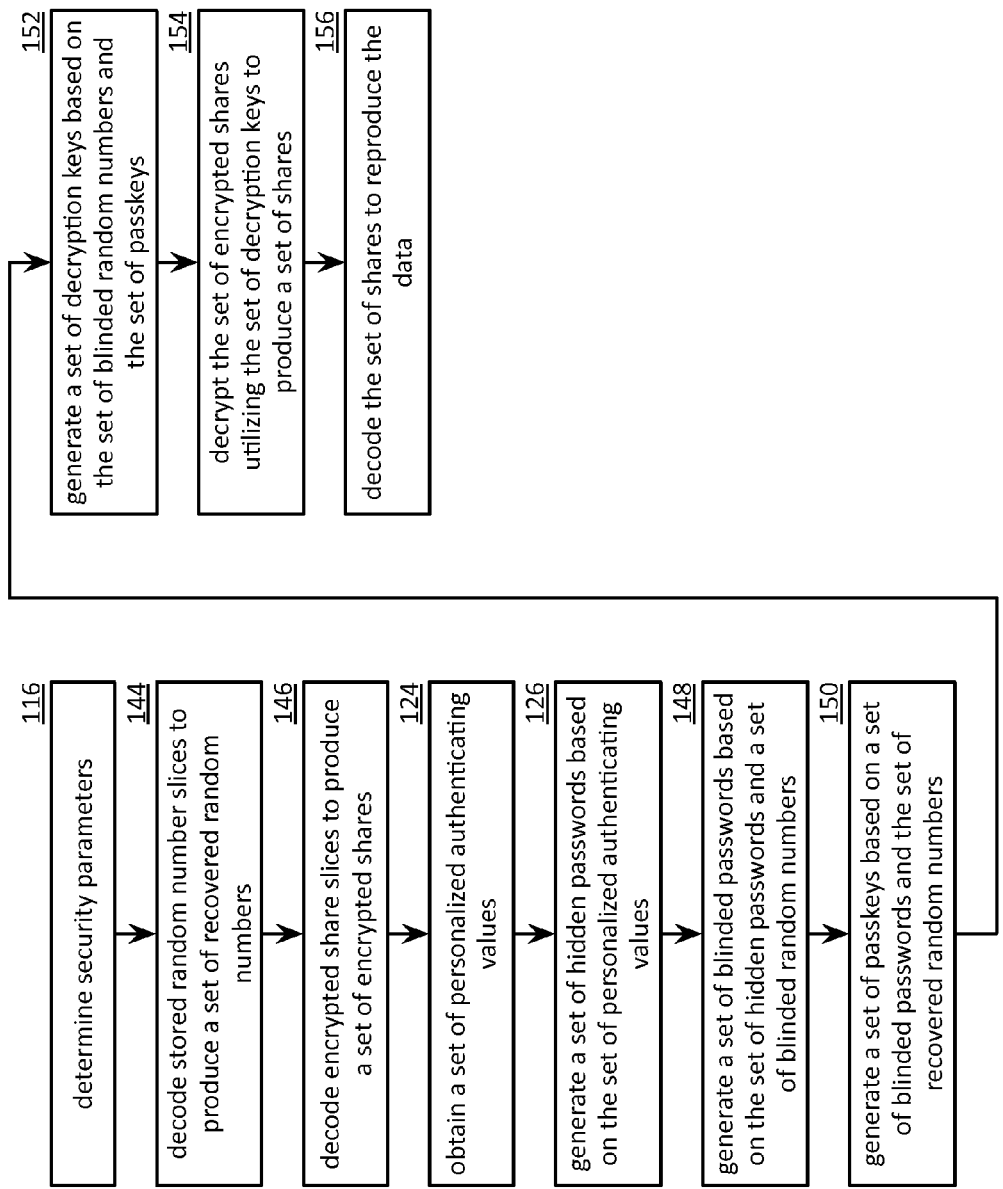
FIG. 10 is a flowchart illustrating an example of retrieving access information in accordance with the invention.

FIG. 10 is a flowchart illustrating an example of retrieving access information, which includes similar steps to FIG. 7. The method begins with step 116 of FIG. 7 where a processing module (e.g., of a user device) determines security parameters. The method continues at step 144 where the processing module decodes at least a decode threshold number of stored random number slices to produce a set of recovered random numbers. For example, the processing module retrieves the at least the decode threshold number of stored random number slices and dispersed storage error decodes the at least the decode threshold number of stored random number slices to produce the set of recovered random numbers. Alternatively, the processing module sends at least one of a random number retrieval request and an access information package retrieval request to at least one dispersed storage (DS) processing module. In such an alternative, the DS processing module retrieves the at least the decode threshold number of stored random number slices and dispersed storage error decodes the at least the decode threshold number of stored random number slices to produce the set of recovered random numbers.

The method continues at step 146 where the processing module decodes at least a decode threshold number of encrypted share slices to produce a set of encrypted shares. For example, the processing module retrieves the at least the decode threshold number of encrypted share slices and dispersed storage error decodes the at least the decode threshold number of encrypted share slices to produce the set of encrypted shares Alternatively, the processing module sends at least one of an encrypted share retrieval request and the access information package retrieval request to at least one dispersed storage (DS) processing module. In such an alternative, the DS processing module retrieves the at least the decode threshold number of encrypted share slices, dispersed storage error decodes the at least the decode threshold number of encrypted share slices to produce the set of encrypted shares, and sends the set of encrypted shares to the processing module (e.g., of the user device).

The method continues with step 124 of FIG. 7 where the processing module obtains a set of personalized authenticating values regarding user access to data. For example, the processing module obtains a personal identification number (PIN) personalized authenticating value via a user input to the user device. As another example, the processing module performs a badge identifier (ID) table lookup to obtain a badge ID personalized authenticating value. The method continues with step 126 of FIG. 7 where the processing module generates a set of hidden passwords based on the set of personalized authenticating values.

The method continues at step 148 where the processing module generates a set of blinded passwords based on the set of hidden passwords and a set of blinded random numbers. The generating includes for each blinded random number of the set of blinded random numbers, transforming a corresponding password of the set of hidden passwords utilizing a mask generating function and the blinded random number to produce a blinded password of the set of blinded passwords. For example, the processing module generates a blinded password x based on a hidden password px and a corresponding blinded random number $b_x$ in accordance with an expression blinded password x=$((MGF(px))^2)^b_x$ modulo p. The processing module generates the set of blinded random numbers by obtaining a set of base random numbers and expanding each base random number of the set of base random numbers based on security parameters to produce the set of blinded random numbers. For example, the processing module produces a blinded random number $b_x$ utilizing a random number generator function such that a bit length of the blinded random number $b_x$ is substantially the same as a bit length of one of a value of a security algorithm constant p and a bit length of a value of a security algorithm constant q. For instance, the processing module produces a blinded random number $b_3$ that is 1,024 bits in length when the security algorithm constant p is 1,024 bits in length.

The method continues at step 150 where the processing module generates a set of passkeys based on the set of blinded passwords and the set of recovered random numbers. The generating the set of passkeys includes at least one of for each blinded password of the set of blinded passwords, transforming the blinded password utilizing a modulo function based on a corresponding recovered random number of the set of recovered random numbers and security parameters to produce a passkey of the set of passkeys and utilizing the set of blinded passwords to access the set of passkeys. Such utilizing of the blinded passwords to access the set of passkeys includes sending the access information retrieval request to the one or more DS access modules, wherein the request includes the set of blinded passwords, and receiving the set of passkeys. Such transforming of the blinded password utilizing a modulo function based on a corresponding recovered random number of the set of recovered random numbers and security parameters to produce a passkey includes is discussed in greater detail with reference to FIG. 12.

The method continues at step 152 where the processing module generates a set of decryption keys based on the set of blinded random numbers and the set of passkeys. The generating the set of decryption keys includes generating a set of values based on the set of blinded random numbers and generating the set of decryption keys based on the set of values and the set of passkeys. The generating the set of values includes transforming the blinded random number utilizing a modulo function based on security parameters to produce a value of the set of values for each blinded random number of the set of blinded random numbers. The generating the set of decryption keys based on the set of values and the set of passkeys includes transforming the passkey utilizing a modulo function based on security parameters and a corresponding value of the set of values to produce a decryption key of the set of decryption keys for each passkey of the set of passkeys. For example, the processing module generates a value $v_x$ of the set of values based on a blinded random number $b_x$ in accordance with the expression b*v modulo q=1, wherein q is a security constant of security parameters such that q=(p−1)/2. For instance, v=b^(q−2) mod q, when q is prime (e.g., 8=7^9 mod 11, 8*7 mod 11=1). The processing module generates a decryption key x based on a value $v_x$ and passkey x in accordance with an expression decryption key x=(passkey x)$^v_x$ modulo p.

The method continues at step 154 were the processing module decrypts the set of encrypted shares utilizing the set of decryption keys to produce a set of shares. The decryption is in accordance with a decryption algorithm and may be based on one or more of the security parameters, error coding dispersal storage function parameters, a user ID, a vault ID, a vault lookup, security requirements, a security status indicator, a message, and a command. The method continues at step 156 where the processing module decodes the set of shares to reproduce the data. Such decoding includes at least one of dispersed storage error decoding the set of shares to produce the data and decoding the set of shares utilizing a secret sharing function to produce the data.

Figure 11:
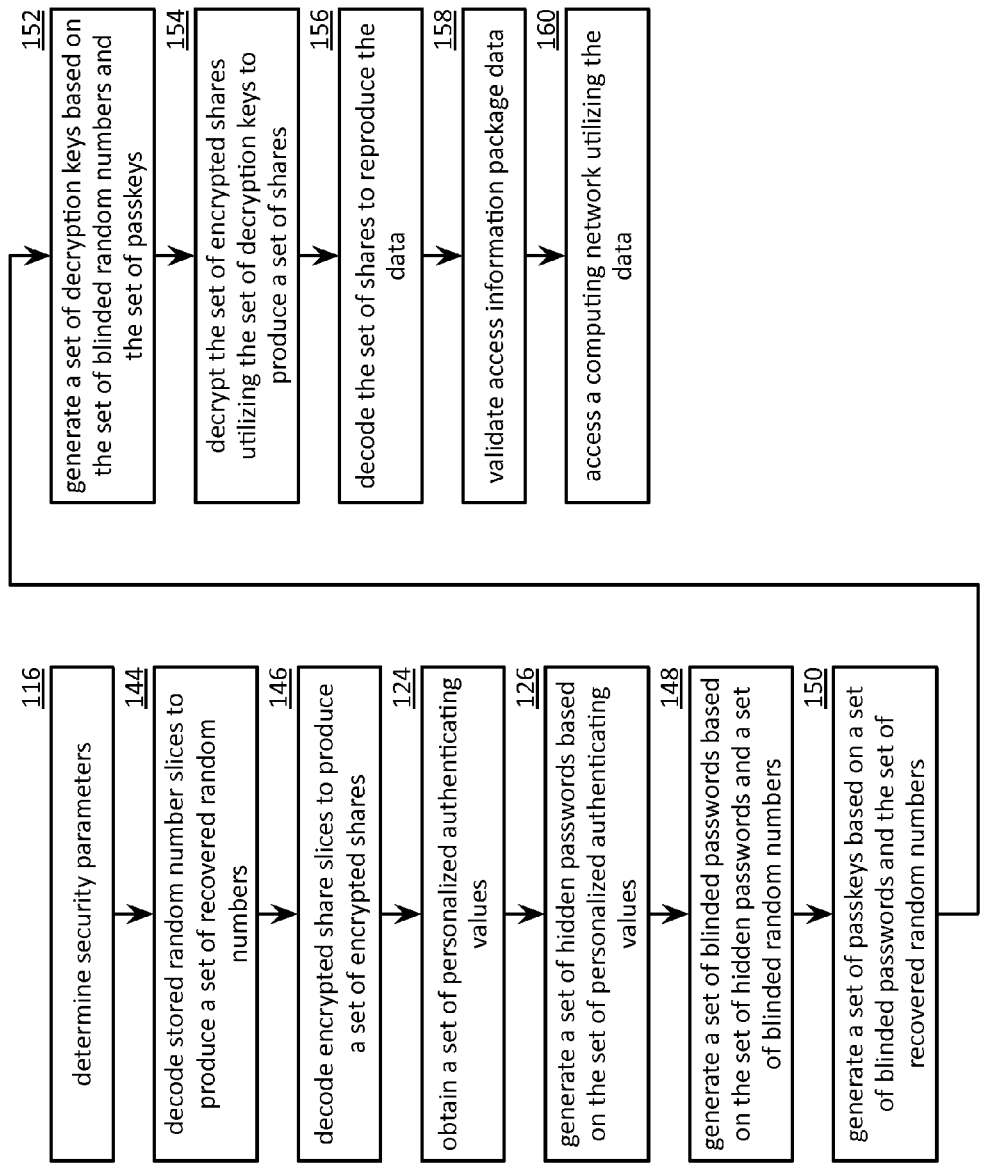
FIG. 11 is a flowchart illustrating an example of retrieving and utilizing access information in accordance with the invention.

FIG. 11 is a flowchart illustrating an example of retrieving and utilizing access information, which includes similar steps to FIG. 10. The method begins with step 116 of FIG. 7 where a processing module (e.g., of a user device) determines security parameters and continues with steps 144-146 of FIG. 10 where the processing module decodes stored random number slices to produce a set of recovered random numbers and decodes encrypted shared slices to produce a set of encrypted shares. The method continues with steps 124-126 of FIG. 7 where the processing module obtains a set of personalized authenticating values and generates a set of hidden passwords based on the set of personalized authenticating values. The method continues with steps 148-156 of FIG. 10 where the processing module generates a set of blinded passwords based on the set of hidden passwords and a set of blinded random numbers, generates a set of passkeys based on a set of blinded passwords and the set of recovered random numbers, generates a set of decryption keys based on the set of blinded random numbers and the set of passkeys, decrypts the set of encrypted shares utilizing the set of decryption keys to produce a set of shares, and decodes the set of shares to reproduce the data.

The method continues at step 158 where the processing module validates the data when the data is an access information package. Such validating includes comparing a calculated hash of access information of the access information package to an access information hash digest of the access information package. For example, the processing module determines that the access information package is valid when the comparison indicates that the calculated hash of the access information is substantially the same as the access information hash digest.

The method continues at step 160 where the processing module accesses a computing network utilizing the data. For example, the processing module generates a wireless network access request utilizing a group broadcast encryption key and a channel identifier of the data to access wireless communications of a group of wireless user devices affiliated with the processing module. As another example, the processing module generates a wireless talk-group transmission request utilizing a talk-group identifier from the data, wherein the talk-group is associated with the group of wireless user devices affiliated with processing module. Next, the processing module outputs the wireless access request. For example, the processing module outputs the wireless access request to a wireless system infrastructure. As another example, the processing module outputs the wireless access request to one or more other wireless user devices.

Figure 12:
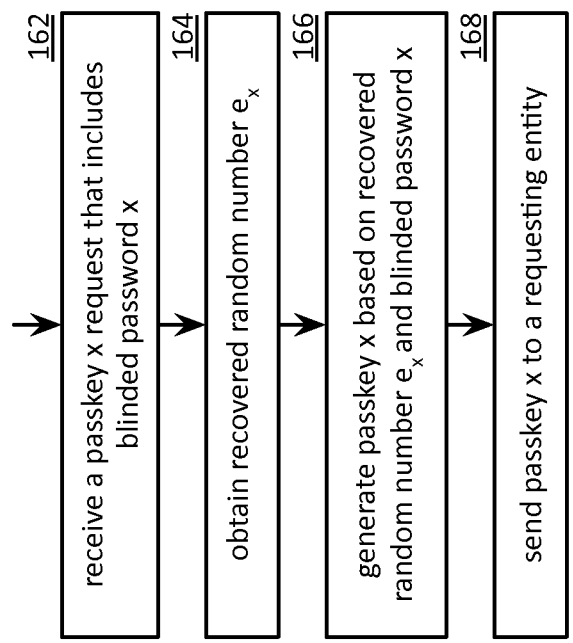
FIG. 12 is a flowchart illustrating an example of generating a passkey in accordance with the invention.

FIG. 12 is a flowchart illustrating an example of generating a passkey in accordance with the invention. The method begins with step 162 where the processing module (e.g., of a dispersed storage (DS) module) receives at least one of a passkey x retrieval request and an access information retrieval request, wherein the request includes at least one of, a user identifier (ID), a vault ID, a source name, one or more slice names, a random number identifier (e.g., a data object name, a block number, a source name, a directory identifier, etc.), and one or more blinded passwords of a set of blinded passwords. For example, the processing module receives a passkey x request from a user device, wherein the request includes a blinded password x and a data object name affiliated with an associated stored random number $e_x$.

The method continues at step 164 where the processing module obtains one or more recovered random numbers of a set of recovered random numbers. The obtaining includes retrieving at least a decode threshold number of stored random number slices and decoding the decode threshold number of stored random number slices to produce a set of recovered random numbers. The retrieving includes at least one of outputting at least one stored random number slices retrieval request message to at least one of a dispersed storage (DS) processing and a DS unit to retrieve the at least the decode threshold number of stored random number slices from at least one dispersed storage network (DSN) memory and receiving the set of stored random number slices.

The method continues at step 166 where the processing module generates a set of passkeys based on the set of blinded passwords and the set of recovered random numbers. Such generation includes transforming the blinded password utilizing a modulo function based on a corresponding recovered random number of the set of recovered random numbers and security parameters to produce a passkey of the set of passkeys for each blinded password of the set of blinded passwords. For example, the processing module generates a passkey x based on a recovered random number $e_x$ and blinded password x in accordance with an expression passkey x=(blinded password x)$^{e_x}$ modulo p. The method continues at step 168 where the processing module outputs the passkey x (e.g., to a requesting entity such as a user device).

The methods described above operate in accordance with mathematical expressions enabling generation of keys utilized to encrypt and decrypt shares of an access information package of data. The mathematical expressions may be further understood in consideration of the following mathematical proof, wherein the proof illustrates that a reproduced key (e.g., to decrypt an encrypted share) is substantially equivalent to an original key (e.g., utilized to encrypt the share to produce the encrypted share).

Proof—Recall that:
b*v=1 mod q and p=2*q+1
This proof will illustrate that:
(MGF(password)^2)^(b*e*v) equals (MGF(password)^2)^e (modulo p)
First, replace MGF(password) with X:
(X^2)^(b*e*v)=(X^2)^(e) (modulo p)
Note that:
Since b*v=1 mod q, it follows that: b*v=n*q+1, for some integer n. Note that (b*v)/q=n remainder 1.
Therefore (b*v) can be substituted with (n*q+1) in the above expression yielding:
(X^2)^((n*q+1)*e) mod p
Since p=2*q+1, taking p out of the formula, resulting in:
(X^2)^((n*q+1)*e) mod (2*q+1)
Since X^2 is raised to a power, simply take X to the power of twice the exponent:
X^(2*(nq+1)*e) mod (2q+1)
Which may be written as:
X^((2nq+2)*e) mod(2q+1)
Multiplying both parts by e:
X^(2nqe+2e) mod(2q+1)
Split these out as so:
X^(2neq)*X^(2e) mod(2q+1)
Re-write the first power of X:
X^(2q*ne)*X^(2e) mod(2q+1)
Which can also be written as:
(X^(2q))^(ne)*X^(2e) mod(2q+1)
Un-doing a the substitution of p for 2q+1, find:
(X^(p−1))^(ne)*X^(2e) mod p
Fermat's Little Theorem shows that for any prime number P, and any integer X, that:
X^(P−1)=1 mod P, therefore (X^(p−1)) mod p=1 mod p. This yields:
1^(ne)*X^(2e) mod p
Which is the same as:
1*X^(2e) mod p
Which is the same as the key:
(X^2)^e mod p
As a numerical example:
p=23
q=(p−1)/2=11
let e1=10
let [mask generating function (common password)]^2=16
key 1=16^e1 mod 23=13
let b1=7
bpass 1=16^7 mod 23=18
passkey 1=bpass^e1 mod p=18^10 mod 23=9
b*v=1 modulo q
b1*v1=1 mod q
7*v1=1 mod 11 note: 56 mod 11=1 so v1=8
regen key 1=passkey1^v1 modulo p
9^8 mod 23=13, which checks with the 13 calculated above for key 1 (i.e., the key).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method comprises:
   decoding at least a decode threshold number of stored random number slices to produce a set of recovered random numbers;
   decoding at least a decode threshold number of encrypted share slices to produce a set of encrypted shares;
   obtaining a set of personalized authenticating values regarding user access to data;
   generating a set of hidden passwords based on the set of personalized authenticating values;
   generating a set of blinded passwords based on the set of hidden passwords and a set of blinded random numbers;
   generating a set of passkeys based on the set of blinded passwords and the set of recovered random numbers;
   generating a set of decryption keys based on the set of blinded random numbers and the set of passkeys;
   decrypting the set of encrypted shares utilizing the set of decryption keys to produce a set of shares; and
   decoding the set of shares to reproduce the data.

2. The method of claim 1 further comprises:
   accessing a computing network utilizing the data.

3. The method of claim 1, wherein the set of personalized authenticating values includes at least one of:
   a user device identifier (ID);
   a user ID;
   a personal information number (PIN);
   a badge ID;
   a district ID;
   a work-shift ID;
   an assignment ID;
   a mission ID;
   a passcode;
   a password;

a picture file;
a video file;
an audio file;
a retinal scan;
a facial scan;
a fingerprint scan;
a personal secret; and
a password index number.

4. The method of claim 1, wherein the generating the set of hidden passwords comprises at least one of:
 transforming the set of personalized authenticating values in accordance with a set of transformation functions to produce a set of transformed personalized authenticating values; and
 for each password of the corresponding plurality of hidden passwords:
  combining, in accordance with a combining function, one of the set of transformed personalized authenticating values with at least one of a constant and another one of the set of transformed personalized authenticating values to produce the password.

5. The method of claim 4, wherein the transformation function includes at least one of:
 a null function;
 a concatenation function;
 an inverting function;
 a hashing function;
 an encryption function;
 a compressing function; and
 a mask generating function.

6. The method of claim 4, wherein the combining function includes at least one of:
 an addition function;
 a subtraction function;
 a multiplication function;
 a division function;
 a logical exclusive OR function;
 a logical OR function; and
 a logical AND function.

7. The method of claim 1 further comprises:
 the generating the set of blinded random numbers including:
  obtaining a set of base random numbers; and
  expanding each base random number of the set of base random numbers based on security parameters to produce the set of blinded random numbers; and
 the generating the set of blinded passwords including:
  for each blinded random number of the set of blinded random numbers, transforming a corresponding password of the set of hidden passwords utilizing a mask generating function and the blinded random number to produce a blinded password of the set of blinded passwords.

8. The method of claim 1, wherein the generating the set of passkeys comprises at least one of:
 for each blinded password of the set of blinded passwords, transforming the blinded password utilizing a modulo function based on a corresponding recovered random number of the set of recovered random numbers and security parameters to produce a passkey of the set of passkeys; and
 utilizing the set of blinded passwords to access the set of passkeys.

9. The method of claim 1, wherein the generating the set of decryption keys comprises:
 generating a set of values based on the set of blinded random numbers; and
 generating the set of decryption keys based on the set of values and the set of passkeys.

10. The method of claim 9 further comprises:
 for each blinded random number of the set of blinded random numbers, transforming the blinded random number utilizing a modulo function based on security parameters to produce a value of the set of values.

11. The method of claim 9, wherein the generating the set of decryption keys further comprises:
 for each passkey of the set of passkeys, transforming the passkey utilizing a modulo function based on security parameters and a corresponding value of the set of values to produce a decryption key of the set of decryption keys.

12. A computer comprises:
 an interface;
 a memory; and
 a processing module operable to:
  decode at least a decode threshold number of stored random number slices to produce a set of recovered random numbers;
  decode at least a decode threshold number of encrypted share slices to produce a set of encrypted shares;
  obtain a set of personalized authenticating values regarding user access to data;
  generate a set of hidden passwords based on the set of personalized authenticating values;
  generate a set of blinded passwords based on the set of hidden passwords and a set of blinded random numbers;
  generate a set of passkeys based on the set of blinded passwords and the set of recovered random numbers;
  generate a set of decryption keys based on the set of blinded random numbers and the set of passkeys;
  decrypt the set of encrypted shares utilizing the set of decryption keys to produce a set of shares; and
  decode the set of shares to reproduce the data.

13. The computer of claim 12, wherein the processing module further functions to:
 access, via the interface, a computing network utilizing the data.

14. The computer of claim 12, wherein the set of personalized authenticating values includes at least one of:
 a user device identifier (ID);
 a user ID;
 a personal information number (PIN);
 a badge ID;
 a district ID;
 a work-shift ID;
 an assignment ID;
 a mission ID;
 a passcode;
 a password;
 a picture file;
 a video file;
 an audio file;
 a retinal scan;
 a facial scan;
 a fingerprint scan;
 a personal secret; and
 a password index number.

15. The computer of claim 12, wherein the processing module functions to generate the set of hidden passwords by at least one of:

transforming the set of personalized authenticating values in accordance with a set of transformation functions to produce a set of transformed personalized authenticating values; and for each password of the corresponding plurality of hidden passwords:

combining, in accordance with a combining function, one of the set of transformed personalized authenticating values with at least one of a constant and another one of the set of transformed personalized authenticating values to produce the password.

16. The computer of claim 15, wherein the transformation function includes at least one of:
a null function;
a concatenation function;
an inverting function;
a hashing function;
an encryption function;
a compressing function; and
a mask generating function.

17. The computer of claim 15, wherein the combining function includes at least one of:
an addition function;
a subtraction function;
a multiplication function;
a division function;
a logical exclusive OR function;
a logical OR function; and
a logical AND function.

18. The computer of claim 12, wherein the processing module further functions to:
generate the set of blinded random numbers by:
obtaining a set of base random numbers; and
expanding each base random number of the set of base random numbers based on security parameters to produce the set of blinded random numbers; and
generate the set of blinded passwords by:
for each blinded random number of the set of blinded random numbers, transforming a corresponding password of the set of hidden passwords utilizing a mask generating function and the blinded random number to produce a blinded password of the set of blinded passwords.

19. The computer of claim 12, wherein the processing module functions to generate the set of passkeys by at least one of:
for each blinded password of the set of blinded passwords, transforming the blinded password utilizing a modulo function based on a corresponding recovered random number of the set of recovered random numbers and security parameters to produce a passkey of the set of passkeys; and
utilizing the set of blinded passwords to access the set of passkeys.

20. The computer of claim 12, wherein the processing module functions to generate the set of decryption keys by:
generating a set of values based on the set of blinded random numbers; and
generating the set of decryption keys based on the set of values and the set of passkeys.

21. The computer of claim 20, wherein the processing module further functions to:
for each blinded random number of the set of blinded random numbers, transforming the blinded random number utilizing a modulo function based on security parameters to produce a value of the set of values.

22. The computer of claim 20, wherein the processing module functions to generate the set of decryption keys further by:
for each passkey of the set of passkeys, transforming the passkey utilizing a modulo function based on security parameters and a corresponding value of the set of values to produce a decryption key of the set of decryption keys.

* * * * *